(12) United States Patent
Misumi

(10) Patent No.: US 6,692,854 B2
(45) Date of Patent: Feb. 17, 2004

(54) FUEL CELL GENERATOR SYSTEM AND METHOD FOR OPERATING SAME

(75) Inventor: Yoshiteru Misumi, Tokyo (JP)

(73) Assignee: Kurita Water Industries, Ltd., Tokyo (JP)

( * ) Notice: Subject to any disclaimer, the term of this patent is extended or adjusted under 35 U.S.C. 154(b) by 0 days.

(21) Appl. No.: 10/252,018

(22) Filed: Sep. 20, 2002

(65) Prior Publication Data

US 2003/0064263 A1 Apr. 3, 2003

(30) Foreign Application Priority Data

Sep. 21, 2001 (JP) .......................................... 2001-289818

(51) Int. Cl.$^7$ ................................................ H01M 8/04
(52) U.S. Cl. .............................. 429/26; 429/13; 429/34
(58) Field of Search ................................ 429/26, 13, 34

(56) References Cited

U.S. PATENT DOCUMENTS 5,980,716 A * 11/1999 Horinouchi et al. ......... 204/524
5,985,474 A * 11/1999 Chen et al. .................... 429/17
6,186,254 B1 * 2/2001 Mufford et al. ............. 180/65.3

* cited by examiner

Primary Examiner—Susy Tsang-Foster
(74) Attorney, Agent, or Firm—Darby & Darby

(57) ABSTRACT

A fuel cell generator system capable of reducing the process cost is described. The fuel cell generator system comprises a fuel cell including a cooling water circulation system, a water process system for processing water to supply as cooling water to the fuel cell, a heater for heating water by utilizing the heat generated in the fuel cell and a hot water storage vessel for storing the hot water from the heater, wherein the water process system is equipped with a water processing apparatus for removing impurities in the supply water and a concentrated water feed line for feeding to the hot water storage vessel, concentrated water in which the impurities are concentrated by the water processing apparatus.

5 Claims, 4 Drawing Sheets

FUEL CELL GENERATOR SYSTEM AND METHOD FOR OPERATING SAME

BACKGROUND OF THE INVENTION

1. Field of the Invention

The present invention relates to a stationary generator system which is equipped with a fuel cell and which fuel, such as natural gas or the like, is reformed with the aid of water vapor to generate fuel gas containing hydrogen gas. This fuel gas is electrochemically reacted with an oxide gas, such as oxygen, in air to generate electric power. The present invention also relates to a method for operating such a generator system.

2. Description of the Related Art

Cooling water is traditionally used in a fuel cell generator system to regulate the temperature in the fuel cell to increase the efficiency of electric power generation in the fuel cell. Cooling water is normally water that has been processed such as by desalinization.

FIG. 4 schematically illustrates a typical fuel cell generator system which includes a fuel cell 1, a water recovery system 2 for recovering water vapor as a condensate from exhaust gas discharged from the fuel cell 1, a water process system 3 for processing the water (raw water) recovered by the water recovery system 2 to supply the processed water as a cooling water to the fuel cell 1, a waste heat recovering heat exchanger 4 for recovering waste heat from fuel cell 1 to heat the water and a hot water storage vessel 5 for storing the hot water from the heat exchanger 4.

The water recovery system 2 is equipped with a condensate recovering heat exchanger 17 for cooling water vapor in the exhaust gas from the fuel cell 1 to generate a condensate, and s equipped with a recovered water storage vessel 18 for storing the recovered water (raw water to be processed as cooling water) obtained by condensation in the heat exchanger 17.

The water process system 3 is equipped with a water processing apparatus 6, such as a reverse osmosis separator, for removing impurities in the recovered water (the raw water to be processed as cooling water), a discharge line 7' for discharging from of the system, water in which impurities are concentrated by the water processing apparatus 6, and a fluid feed pump P1.

Hot water storage vessel 5 is designed such that the hot water in the vessel can be supplied to an external heat installation (not shown).

In this fuel cell generator system, fuel such as natural gas is reformed in the fuel cell 1 with water vapor to generate fuel gas containing hydrogen gas. This fuel gas is electrochemically reacted with an oxidizable gas such as oxygen in air to generate electric power. At the same time, water vapor in the exhaust gas is cooled to generate a condensate in the condensate recovery heat exchanger 17, and then, the recovered condensate is stored in recovered water storage vessel 18.

Impurities, such as carbonic acid ions, metal ions, and the like, resulting either from the exhaust gas discharged from the fuel cell 1 or from supply water, may be found in the raw water stored in the recovered water storage vessel 18. Raw water is fed as cooling water to the fuel cell 1 after complete removal of the impurities by the water processing apparatus 6.

In the water processing apparatus 6, the water in which the removed impurities are concentrated is discharged from the system via the discharge line 7' (e.g., to a sewer or the like).

When the amount of water in the recovered water storage vessel 18 falls below a predetermined level when it is used as cooling water, supply water such as tap water is fed to the recovered water storage vessel 18 via a supply water feed line 51.

When the amount of water in the hot water storage vessel 5 falls below a predetermined level when the hot water is supplied to the external heat usage equipment (not shown), supply water such as tap water is fed to hot water storage vessel 5 via a hot water feed line 52.

However, because concentrated water (which contains concentrated impurities) is discharged from the system from this water processing apparatus 6, the cost of processing the exhaust water in the system (for instance, the fee for tap water to be used) increases.

SUMMARY OF THE INVENTION

Accordingly, it is an object of the present invention to provide a fuel cell generator system which is capable of reducing the processing cost of exhaust water discharged from the system.

It is another object of the present invention to provide a method for effectively operating such a fuel cell generator system.

The first object of the present invention is achieved with a fuel cell generator system comprising: a fuel cell; a water process system for processing raw water to produce cooling water and for supplying the cooling water to the fuel cell; means for heating the water with heat generated in the fuel cell; and a hot water storage vessel for storing the hot water from the heating means, wherein the water process system comprises: a water processing apparatus for separating the raw water into cooling water with impurities removed and concentrated water with the impurities; and a concentrated water feed line for feeding the concentrated water to the hot water storage vessel.

In an aspect of the fuel cell generator system according to the invention, the water processing apparatus is equipped with a plurality of water processing units and one or more lines for collecting the concentrated water from water processing units other than the first water processing unit.

In another aspect of the fuel cell generator system according to invention, the water processing apparatus includes a reverse osmosis separator as a first water processing unit positioned at a first stage and an electric deionizer as a second water processing unit.

The second object of the present invention is achieved by operating a fuel cell generator system comprising: a fuel cell; a water process system for processing raw water to produce cooling water and for supplying the cooling water to the fuel cell; means for heating the water with the heat generated in the fuel cell; and a hot water storage vessel for storing the hot water from the heating means, wherein concentrated water in which impurities removed from the raw water in the water process system are concentrated is fed to the hot water storage vessel.

In the fuel cell generator system according to the invention, the water process system may be equipped with a water processing apparatus for removing impurities from the raw water used as the cooling water and may be equipped with a concentrated water feed line for feeding the concentrated water to the hot water storage vessel. The impurities are concentrated in the concentrated water by the water processing apparatus, so that the concentrated water discharged from the water processing apparatus can be supplied as supply water to the hot water storage vessel.

Consequently, the amount of the supply water, such as tap water, to be supplied to the hot water storage vessel can be reduced, which will lower the cost of supply water. Additionally, the amount of water to be discharged outside of the system can be decreased, which will lower the cost of processing waste water.

When the water processing apparatus in the fuel cell generator system of this embodiment includes a plurality of water processing units, the amount of water discharged from the water process system will not increase of the load to the water process system if the lines for collecting concentrated water from the water processing unit are not located at the first stage. This will increase efficiency of water and will reduce the cost of supplying water.

Further objects, features, and advantages of the present invention will become apparent from the following description of the preferred embodiments with reference to the attached drawings.

FIGURE KEY

Figure 1:
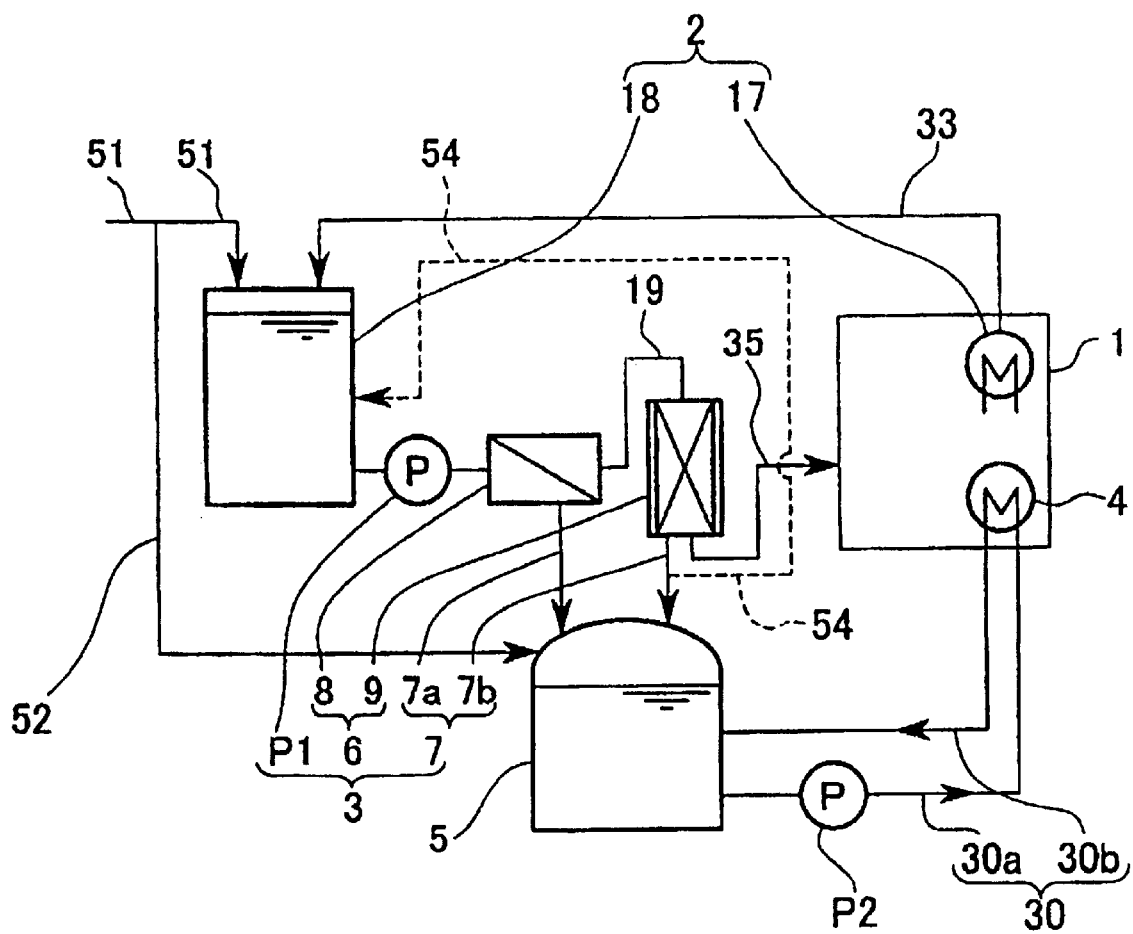
FIG. 1 schematically illustrates a block diagram of functional elements in a first embodiment of a fuel cell generator system according to the invention.
Figure 2:
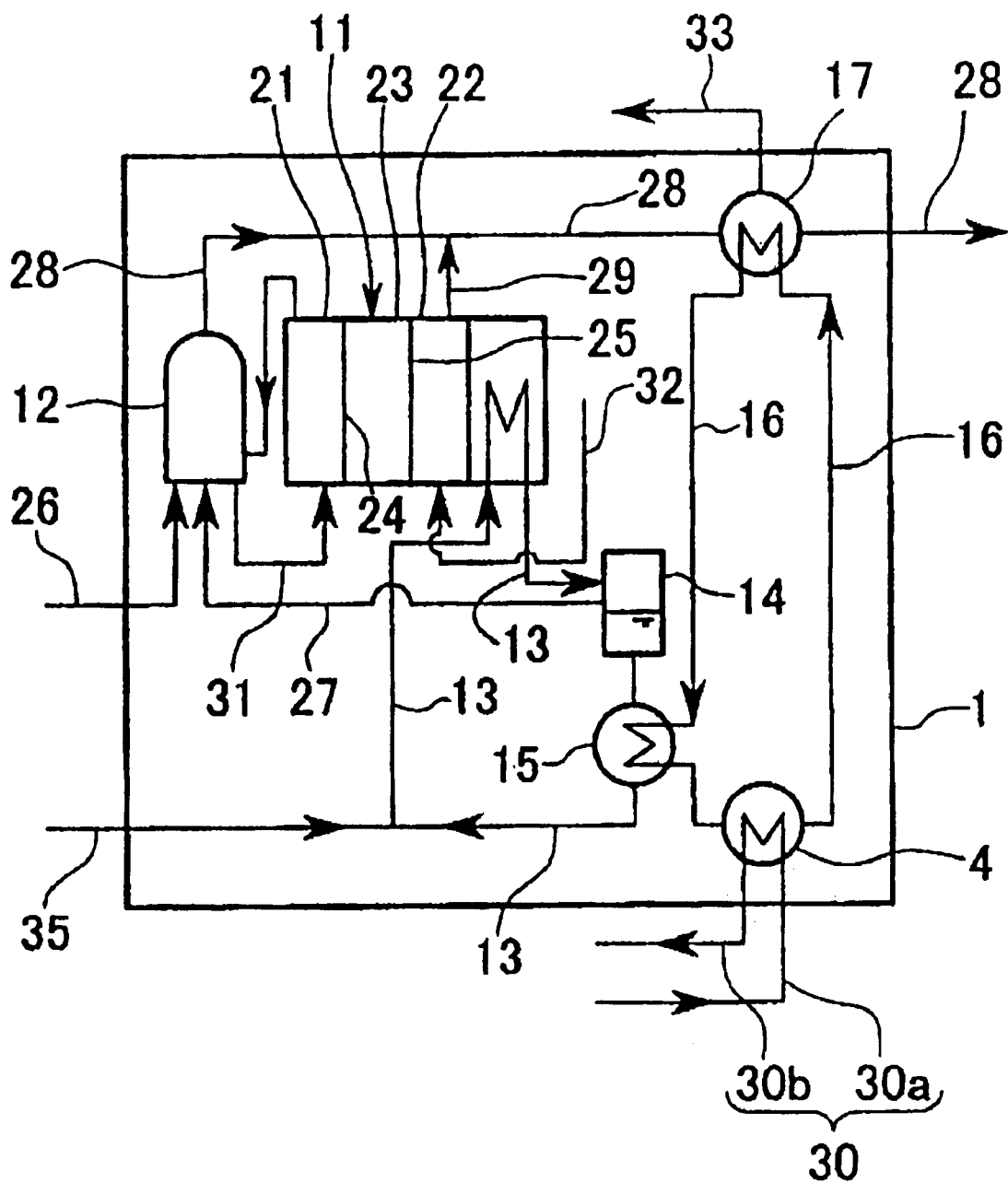
FIG. 2 is a block diagram of a main part in the fuel cell generator system shown in FIG. 1.

FIG. 1
1 fuel cell
2 water recovery system
3 water process system
4 heat exchanger for recovering waste heat (heating means)
5 hot water storage vessel
6 water processing apparatus
7 concentrated water feed line
8 reverse osmosis separator (water processing unit)
9 electric deionizer (water processing unit)
54 concentrated water recovery line
FIG. 2
13 cooling water circulating line

DETAILED DESCRIPTION OF THE INVENTION

FIGS. 1 and 2 illustrate a first embodiment of a fuel cell generator system according to the present invention. The generator system comprises a fuel cell 1, a water recovery system 2 for condensing water vapor from exhaust gas discharged from the fuel cell 1 to recover a condensate, a water process system 3 for processing the recovered water (raw water) recovered by the water recovery system 2 to feed it as a cooling water to the fuel cell 1, a heat exchanger 4 for recovering waste heat, i.e., heat means for heating the water with waste heat from the fuel cell 1, and a hot water storage vessel 5 for storing the hot water from the heat exchanger 4.

As shown in FIG. 2, the fuel cell I includes a fuel cell main body 11, a reformer 12 for reforming the fuel with water vapor, a cooling water circulation line 13 for circulating water for cooling the fuel cell main body 11, a water vapor separator 14 for supplying the water vapor used in the reformer 12, a heat exchanger 15 for cooling the cooling water, and a circulation line 16 for circulating the system water heat exchanged with the cooling water in the heat exchanger 15.

The fuel cell main body 11 is constituted such that an electrolyte 23 is interposed between an anode 21 and a cathode 22 via a pair of electrodes 24 and 25.

The water vapor separator 14 is disposed in the cooling water circulation line 13 in order to separate water vapor from the cooling water.

The reformer 12 is constituted such that the fuel supplied from a fuel feed line 26 is reformed with water vapor supplied from the water vapor separator 14 via a water vapor feed line 27 to generate fuel gas containing hydrogen gas.

The water recovery system 2 shown in FIG. 1 includes a condensate recovery heat exchanger 17 disposed in the fuel cell 1 and a collected water storage vessel (raw water storage vessel for the cooling water) 18 for storing the water (the raw water) recovered by the heat exchanger 17.

As shown in FIG. 2, the condensate recovery heat exchanger 17 is disposed in the system water circulation line 16, and is constituted such that water vapor in the waste gas discharged from the reformer 12 and the cathode 22 via discharge lines 28 and 29 is cooled by the system water in order to form a condensate, and the condensate is recovered.

The water process system 3 shown in FIG. 1 is equipped with a water processing apparatus 6 for removing impurities in the raw water supplied from the recovered water storage vessel 18; a concentrated water feed line 7 for feeding, to the hot water storage vessel 5, concentrated water in which the impurities removed by the water processing apparatus 6 are concentrated; and a fluid feed pump P1.

The water processing apparatus 6 is equipped with a reverse osmosis separator 8 as a first stage water processing unit positioned at the first stage and an electric deionizer 9 as a second stage water processing unit.

The reverse osmosis separator 8 is a membrane separator and include reverse osmosis membranes. In this separator 8, the processed water in which the impurities are removed by the reverse osmosis membranes may be fed to the electric deionizer 9 via a conduit 19.

Figure 3:
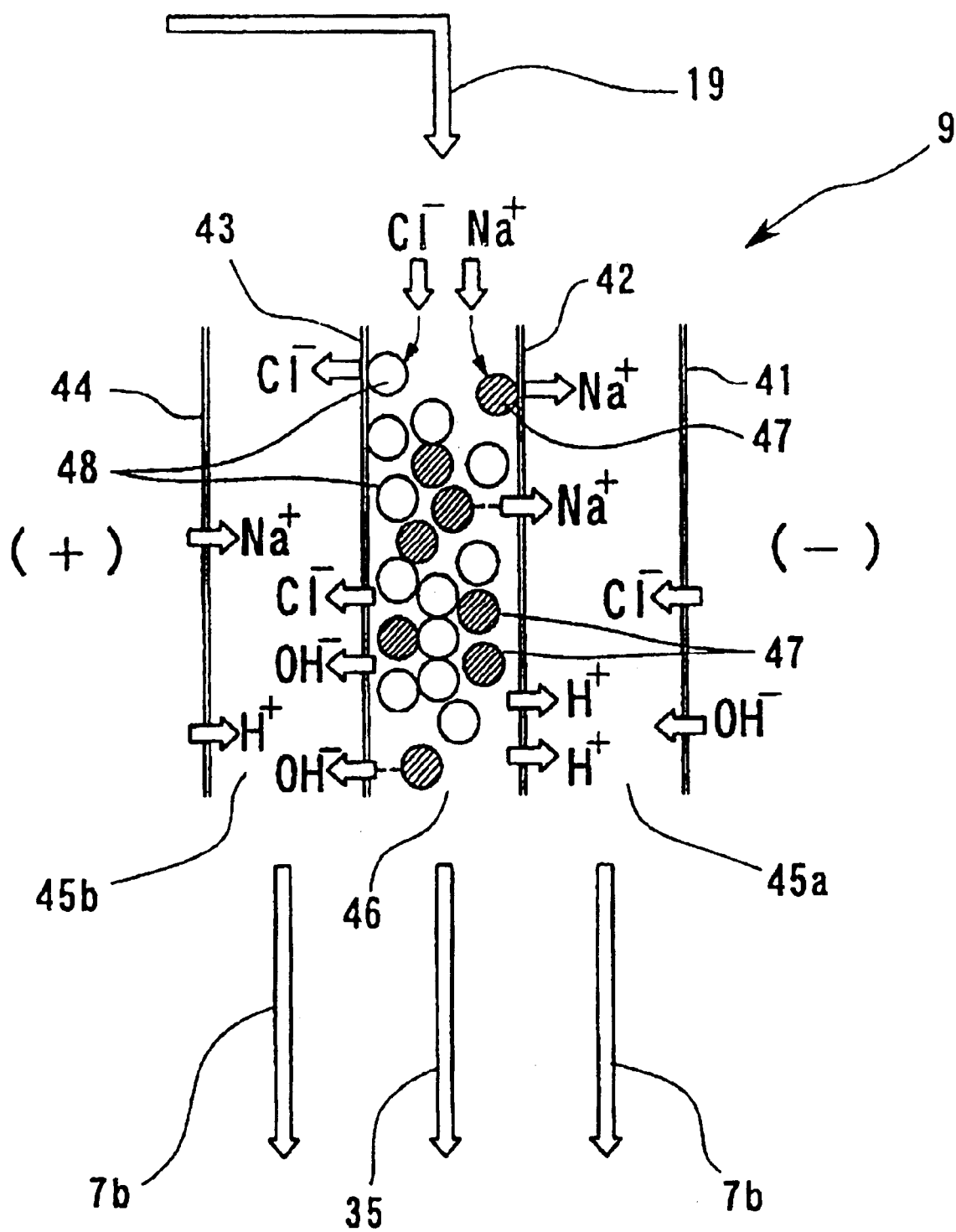
FIG. 3 is a schematic view showing the principle of an electric deionizer employed in the fuel cell generator system shown in FIG. 1.

As shown in FIG. 3, the electric deionizer 9 includes a cation exchange membrane 42 and an anion exchange membrane 43 facing each other, an anion exchange membrane 41 and a cation exchange membrane 44 between which the cation and anion exchange membranes 42 and 43 are interposed, and cation and anion exchange resins 47 and 48 which are filled between the exchange membranes 42 and 43.

A concentration chamber 45a is formed between the anion exchange membrane 41 and the cation exchange membrane 42, and a dilution chamber 46 is formed between the cation exchange membrane 42 and the anion exchange membrane 43. Similarly, a concentration chamber 45b is formed between the anion exchange membrane 43 and the cation exchange membrane 44.

The electric deionizer 9 is constituted such that the ions (exemplified as Na+ and Cl- in FIG. 3) in the processed water introduced into the dilution chamber 46 are moved to the concentration chambers 45a and 45b, passing through the ion exchange resins 47, 48 and the ion exchange membranes 42, 43. Then, the processed water obtained by removing the ions is fed from the dilution chamber 46 to the fuel cell 1 via a cooling water feed line 35.

The concentrated water feed line 7 includes a feed line 7a for feeding to the hot water storage vessel 5, the concentrated water containing concentrated impurities such as the ions and the like in the reverse osmosis separator 8, and a feed line 7b for feeding the concentrated water obtained by concentrating the ions in the deionizer 9 from the concentration chambers 45a and 46b to the hot water storage vessel 5.

The heat exchanger 4 for recovering the waste heat is disposed in the system water circulation line 16, and the heat exchanger 4 is constituted such that the water supplied from the hot water storage vessel 5 via feed line 30a of hot water circulation line 30 is heated by the system water.

Moreover, the hot water storage vessel 5 is constituted such that the hot water in the hot water storage vessel can be fed to an external heat use (not shown).

In this case, reference numeral 51 indicates a supply water feed line for feeding the supply water to the collected water storage vessel 18, and reference numeral 52 indicates another supply water feed line for feeding the supply water to the hot water storage vessel 5.

As shown in FIG. 2, in the fuel cell generator system, fuel such as desulfurized natural gas, LPG, or the like is fed to the reformer 12 via the fuel supply line 26 and is reformed with water vapor supplied from the water vapor separator 14 via the water vapor supply line 27 to form a fuel gas containing hydrogen.

This fuel gas is supplied to the anode 21 of the fuel cell stack 11 via the fuel gas feed line 31 after passing through a shift converter for carbon monoxide (not shown). Oxidizable gas such as oxygen in air is supplied to the cathode 22 via an oxidizable gas feed line 32. The fuel gas is electrochemically reacted with the oxidizable gas to generate electric power.

Waste gas from the anode 21 is discharged from the reformer 12 via discharge line 28, after passing through the condensate recovery heat exchanger 17. Waste gas from the cathode 22 is discharged via discharge line 29, is then mixed with the exhaust gas from the reformer in the discharge line 28, and is finally discharged via the condensate recovery heat exchanger 17.

In cooling water circulation line 13, the cooling water is circulated to cool the fuel cell stack 11 to a predetermined temperature. In this case, the cooling water is heated and is then fed as a hot water to the water vapor separator 14.

In the water vapor separator 14, the exhaust vapor is separated from the cooling water and part thereof is supplied to the reformer 12 via the water vapor feed line 27.

The cooling water passed through the water vapor separator 14 is cooled in the heat exchanger 15 by heat exchange with the system water flowing in system water circulation line 16, and is again fed to the fuel cell stack 11. This circulation process may be repeated.

The system water flowing in system water circulation line 16 cools the cooling water in the heat exchanger 15 and further cools both the waste gas from the anode 21 and the waste gas from the cathode 22 in the discharge line 28 in the condense recovery heat exchanger 17 to condense the water vapor in the waste gases.

The condensate collected in the condensate recovery heat exchanger 17 is fed to the recovered water storage vessel 18 via a condensate recovery line 33.

The system water heated in heat exchangers 15 and 17 heats up the water supplied via feed line 30a by fluid feed pump P2 in the waste heat recovery heat exchanger 4. This hot water is supplied to hot water storage vessel 5 via return line 30b.

When the amount of water in the hot water storage vessel 5 falls below a predetermined level through the supply of the hot water to external heat usage equipment (not shown), supply water, such as tap water, is supplied to the hot water storage vessel 5 via a supply water feed line 52.

The cooling water flowing in cooling water circulation line 13 is partially separated as water vapor in the water vapor separator 14, and is then discharged from the cooling circulation line 13 via line 27. Therefore, water must be added because of the decreased amount of the cooling water. In this case, the water in recovery storage vessel 18 is supplied to water processing apparatus 6 by fluid feed pump P1 in order to remove impurities such as ions and solid substances, and this purified water is further supplied as a cooling water to the cooling water circulation line 13 via cooling water feed line 35.

The reverse osmosis separator 8 in the water processing apparatus 6 is constituted such that the processed water in which the impurities are removed by the reverse osmosis membranes is supplied to the electric deionizer 9 via conduit 19 and the concentrated water in which the impurities are concentrated is supplied to the hot water storage vessel 5 via concentrated water feed line 7a.

In the electric deionizer 9, ions (exemplified as Na+ and Cl− in FIG. 3) in the processed water are moved to the concentration chambers 45a and 45b, passing through the ion exchange resins 47, 48 and the ion exchange membranes 42, 43. The finally processed water in the dilution chamber 46, which is obtained by removing the ions, is supplied to cooling water circulation line 13 via cooling water feed line 35, and the concentrated water in concentration chambers 45a and 45b, (the water being concentrated by the removed ions) is supplied to the hot water storage vessel 5 via concentrated water feed line 7b.

When the amount of water in the hot water storage vessel 5 falls below a predetermined because it was supplied to an external heat installation (not shown), supply water such as tap water is supplied to the hot water storage vessel 5 via supply water feed line 52.

When the amount of water in the recovered water storage vessel 18 of the water recovery system 2 falls below a predetermined level because it was supplied as cooling water, supply water, such as the tap water, is fed to the recovered water storage vessel 18 via supply water feed line 51.

Since the fuel cell generator system in a preferred embodiment is equipped with water processing apparatus 6 for removing the impurities in the raw water and with the concentrated water feed line 7 for feeding the concentrated water in which the impurities are removed by the water processing apparatus 6 to hot water storage vessel, the concentrated water discharged from both the reverse osmosis separator 8 and the electric deionizer 9 is supplied as a supply water to hot water storage vessel 5.

As a result, the amount of the supply water such as tap water, to be supplied to hot water storage vessel 5 via the supply water feed line 52 can be decreased, thereby reducing the cost of feeding supply water.

Figure 4:
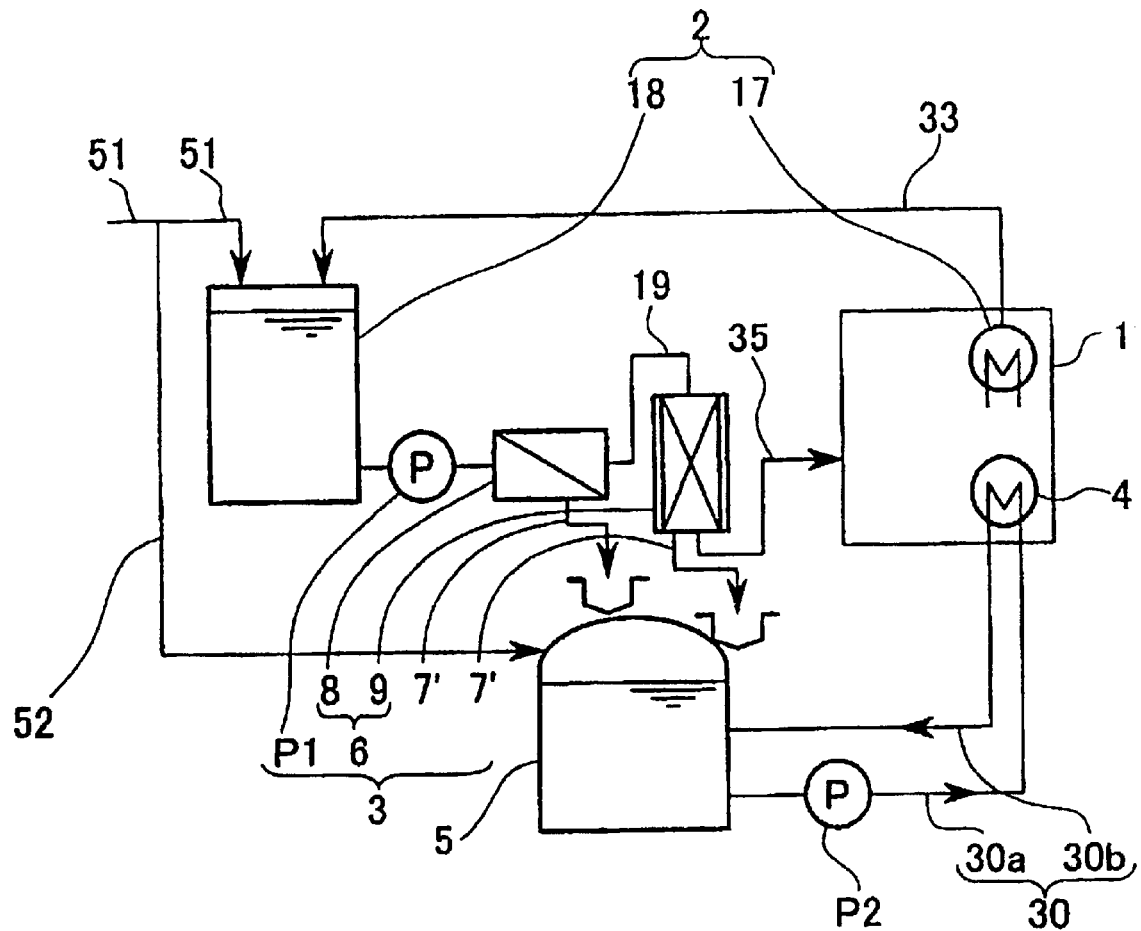
FIG. 4 is a schematic block diagram illustrating the function of a fuel cell generator system in the prior art.

Since concentrated water feed line 7 is disposed for supplying concentrated water to the hot water storage vessel 5, the amount of water to be discharged from the system can be reduced more than with conventional fuel cell generator system (see FIG. 4) which include the discharge line 7' for discharging the concentrated water from the system. Therefore, the cost of processing waste water can also be reduced significantly.

In accordance with the fuel cell generator system of this embodiment, when the water processing apparatus is constituted of a plurality of water process units, a structural arrangement in which feed lines capable of recovering the concentrated water from the water process units other than the first stage water processing unit (i.e., water process units at the second stage and thereafter) may be employed.

More specifically, in addition to the structural arrangement shown in FIGS. 1 to 3, a recovery feed line for supplying the concentrated water from the electric deionizer 9 to the recovered water storage vessel 18 of the water recovery system 2 can be employed, as indicated by the dotted line 54 in FIG. 1, wherein the electric deionizer 9 is situated at the rear stage of the two water process units 8 and 9 in the water processing apparatus 6.

In this fuel cell generator system, processed water is supplied to the electric deionizer 9 after removing most of the ions from the raw water by the reverse osmosis separator 8 so that the concentrated water that is discharged from the electric deionizer 9 has reduced impurity concentration.

The reuse of concentrated water, which is supplied to the recovered water storage vessel 18 via the concentrated water recovery line 54, reduces the amount of water discharged from the water process system 3 via the feed line 7 but does not increase the load on to the water process system 3. As a result, water usage efficiency is increased and the amount of water supplied from the supply water feed line 51 is reduced. This allows the cost for supply water to be significantly reduced.

In a preferred embodiment of the fuel cell generator system, the water processing apparatus 6 is constituted of both the reverse osmosis separator 8 and the electric deionizer 9. However, water processing apparatus 6 can also be constituted of a general purpose ion exchange type deionizer, an ultrafilter equipment, and the like. In the above-described embodiment, the water processing apparatus 6 is constituted of two water process units 8 and 9. However, the water processing apparatus can also include a single unit or more than three units.

In a preferred embodiment of the fuel cell generator system, the recovered water, which is recovered by the heat exchanger 17 for recovering the condensate from the waste gas, is used as cooling water. However, the present invention is not restricted to such a structural arrangement. It is also possible that, for instance, no water vapor in the waste gas is recovered, but the supply water, such as the tap water, is used as the raw water.

While preferred embodiments have been shown and described, various modifications and substitutions may be made without departing from the spirit and scope of the invention. Accordingly, it is to be understood that the present invention has been described by way of example, and not by limitation.

What is claimed is:

1. A fuel cell generator system comprising: a fuel cell; a water process system for processing raw water having impurities to cooling water without impurities and for supplying said cooling water to said fuel cell; a heater for heating water with heat generated in said fuel cell; and a hot water storage vessel for storing said heated, wherein said water process system comprises: a water process apparatus for separating said raw water into said cooling water without impurities and concentrated water having said impurities; and a concentrated water feed line for feeding said concentrated water to said hot water storage vessel.

2. A fuel cell generator system according to claim 1, wherein said water processing apparatus comprises a plurality of water processing units, one of which is a first stage unit; and one or more lines for recovering said concentrated water from said water processing units other than said first stage unit.

3. A fuel cell generator system according to claim 1, wherein said water processing apparatus comprises a reverse osmosis separator as a first stage water processing unit and an electric deionizer as a second stage water processing unit.

4. A fuel cell generator system according to claim 2, wherein said water processing apparatus comprises a reverse osmosis separator as a first stage water processing unit and an electric deionizer as a second stage water processing unit.

5. A method for cooling a fuel cell, said method comprising operating a fuel cell generation system comprising a fuel cell; a water process system for processing raw water having impurities to cooling water without impurities and for supplying said cooling water to said fuel cell; a heater for heating the water with heat generated in said fuel cell; and a hot water storage vessel for storing the heated, wherein concentrated water, in which impurities removed from said raw water in said water process system is concentrated, is fed to said hot water storage vessel.

* * * * *